(12) United States Patent
Christison et al.

(10) Patent No.: US 7,995,143 B2
(45) Date of Patent: Aug. 9, 2011

(54) WIRELESS VIDEO LINK SYNCHRONIZATION

(75) Inventors: Gregory L. Christison, McKinney, TX (US); Fred S. Stivers, Wylie, TX (US); Felix C. Fernandes, Plano, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1315 days.

(21) Appl. No.: 11/353,291

(22) Filed: Feb. 10, 2006

(65) Prior Publication Data

US 2007/0189399 A1   Aug. 16, 2007

(51) Int. Cl.
*H04N 5/04* (2006.01)
*H04N 9/44* (2006.01)

(52) U.S. Cl. .................. 348/500; 348/513; 348/537

(58) Field of Classification Search .......... 348/500, 348/510, 512–514, 518, 536–549; *H04N 5/04, H04N 9/44*
See application file for complete search history.

(56) References Cited

U.S. PATENT DOCUMENTS

| | | | |
|---|---|---|---|
| 6,725,388 B1 * | 4/2004 | Susnow | 713/400 |
| 7,436,456 B2 * | 10/2008 | Morel et al. | 348/512 |
| 7,561,582 B2 * | 7/2009 | Ohta et al. | 370/395.62 |
| 2001/0020951 A1 | 9/2001 | Onagawa | |

FOREIGN PATENT DOCUMENTS

| | | |
|---|---|---|
| EP | 1320213 A1 | 6/2003 |
| EP | 1339182 A2 | 8/2003 |
| EP | 1471745 A1 | 10/2004 |

OTHER PUBLICATIONS

International Search Report for PCT/US2007/061926 dated Nov. 23, 2007.
Written Opinion—PCT/US07/061926, International Search Authority—European Patent Office, Nov. 23, 2007.
International Preliminary Report on Patentability—PCT/US07/061926, The International Bureau of WIPO—Geneva, Switzerland, Aug. 12, 2008.

* cited by examiner

*Primary Examiner* — Trang U Tran
(74) *Attorney, Agent, or Firm* — Semion Talpalatsky

(57) ABSTRACT

The present invention provides a method and apparatus for synchronizing wireless video data. The method involves first synchronizing the pixel clock of a video output device with the pixel clock of a video input device. This is accomplished by latching video counters in the input and output devices (creating a transmit and receive timestamp) for each wireless video data packet and adjusting the pixel clock frequency of the output device according to differences between these timestamps. Once the pixel clocks are synchronized, video frames from the video output device are synchronized with video frames from video input device such that only a fraction of a video frame is buffered at any time. The video frames are synchronized by offsetting the data stream from the video input device N lines ahead of the data stream from the video output device, wherein N is less than the total number of lines in a single video frame.

17 Claims, 4 Drawing Sheets

WIRELESS VIDEO LINK SYNCHRONIZATION

TECHNICAL FIELD

The present invention relates generally to wireless communications, and more specifically to a method for synchronizing video data to avoid disruption of video images.

BACKGROUND OF THE INVENTION

A key concern related to the introduction of wireless video data is the proper synchronization of that data across the wireless data links. Without this synchronization the stream of video data can experience disruptions which negatively affect the video display.

FIG. 1 is a block diagram of a typical wireless video system. A video data stream is transferred wirelessly from a video source 100 to a video sink 110 (e.g., computer monitor, television, etc.). The wireless video input device 101 and output device 111 provide the wireless, connectivity. The problem is how to maintain synchronization of the video data stream across the wireless interface, so that the video sink 110 sees no disruption of video data.

Current approaches maintain synchronization on a video frame basis. With this method, the wireless video output device has buffering for two complete video frames (A and B). While the data for the current video frame is being read from buffer A, the data for next video frame is being written to buffer B (and vice versa). At startup, video output is disabled until an entire video frame has been buffered. During operation, if the next video frame is not available upon completion of the previous frame, the previous frame is replayed. If no buffer is available for the next video frame, the data for this frame is discarded. Unfortunately, this method requires large amounts of buffering. For example, a UXGA video data stream, 1600×1200, would require 11.0 MB of buffering.

Therefore, it would be desirable to have a method for maintaining synchronization of wireless video data without the need for the large data buffering employed by current approaches.

SUMMARY OF THE INVENTION

The present invention provides a method and apparatus for synchronizing wireless video data. The method involves first synchronizing the pixel clock of a video output device with the pixel clock of a video input device. This is accomplished by latching video counters in the input and output devices (creating a transmit and receive timestamp) for each wireless video data packet and adjusting the pixel clock frequency of the output device according to differences between these timestamps. Once the pixel clocks are synchronized, video frames from the video output device are synchronized with video frames from video input device such that only a fraction of a video frame is buffered at any time. The video frames are synchronized by offsetting the data stream from the video input device N lines ahead of the data stream from the video output device, wherein N is less than the total number of lines in a single video frame.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
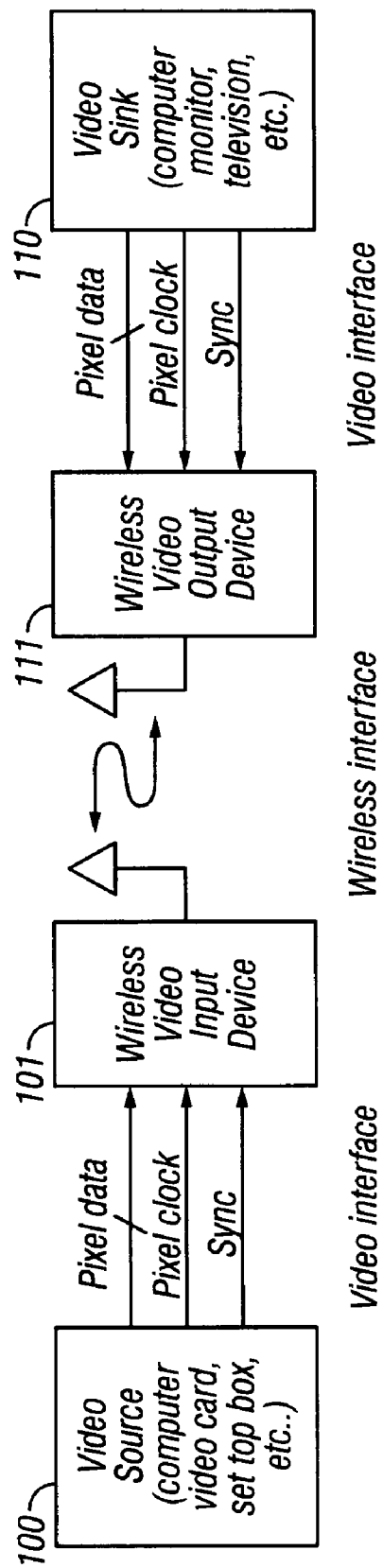
FIG. 1 is a block diagram of a typical wireless video system.

The present invention minimizes the amount of buffering required for wireless video data (to a fraction of a video frame) by using wireless video link synchronization. This synchronization comprises two principle parts:

Pixel clock synchronization—synchronizing the output pixel clock to the input pixel clock Video frame synchronization—synchronizing the output video frame to the input video frame The pixel clock determines the speed at which pixels are drawn on a screen. The pixel clock frequency is determined by the video resolution and the screen refresh rate. Typical, screen refresh rates are 60 and 85 Hz (i.e. how many video frames are displayed every second). A faster pixel clock frequency is needed for larger resolutions at the same refresh rate. Resolutions are described by their active pixels per line and active lines per frame. For example, a resolution of 640×480 has 640 active pixels per line and 480 active lines per frame, but has 800 total pixels per line and 525 total lines per frame. Therefore, for a 60 Hz refresh rate, the pixel clock for 640×480 resolution (Video Graphic Array (VGA)) is 800 pixels/line×525 lines per frame×60 frames per second*1 clock per pixel=25.2 MHz. Unless the pixel clocks are synchronized (i.e. maintain the video counters equal to one another) there is no way to keep the video frames synchronized.

Pixel clock synchronization tunes the video output pixel clock to the video input pixel clock. The video input and output devices maintain free running counters (video counters) on their respective pixel clocks. For the video input device, the value of the video counter is latched upon wireless transmit initiation, and a transmit timestamp is inserted into the wireless video data packet that caused the counter to be latched. For the video output device, the value of its video counter is latched (receive timestamp) upon detection of a valid wireless packet on the air.

A signal (PHY active) from the physical layer (PHY) in the video input and output devices indicates whether the device is actively transmitting or receiving a wireless packet. In each case (transmit or receive), PHY active is asserted at the same relative position with respect to the start of the packet on the air.

Using the transmit and receive timestamps, the video output device adjusts its pixel clock faster or slower to drive the timestamps equal to one another. If the transmit timestamp is greater than the receive timestamp, the video output pixel clock frequency is increased. If the transmit timestamp is less then the receive timestamp, the video output pixel clock frequency is decreased. In practice, adjustments to the video output pixel clock frequency must be made carefully to prevent the clock frequency from oscillating continuously. The present invention uses the controller described below for fast, stable synchronization with fixed-point arithmetic.

The following terms are important for understanding the operation of the present invention:

1) txTstamp=transmit timestamp,
2) rxTstamp=receive timestamp,
3) pGain=proportional gain.
4) dGain=differential gain.
5) divf=16-bit control input that varies video output clock frequency linearly.

Figure 2:
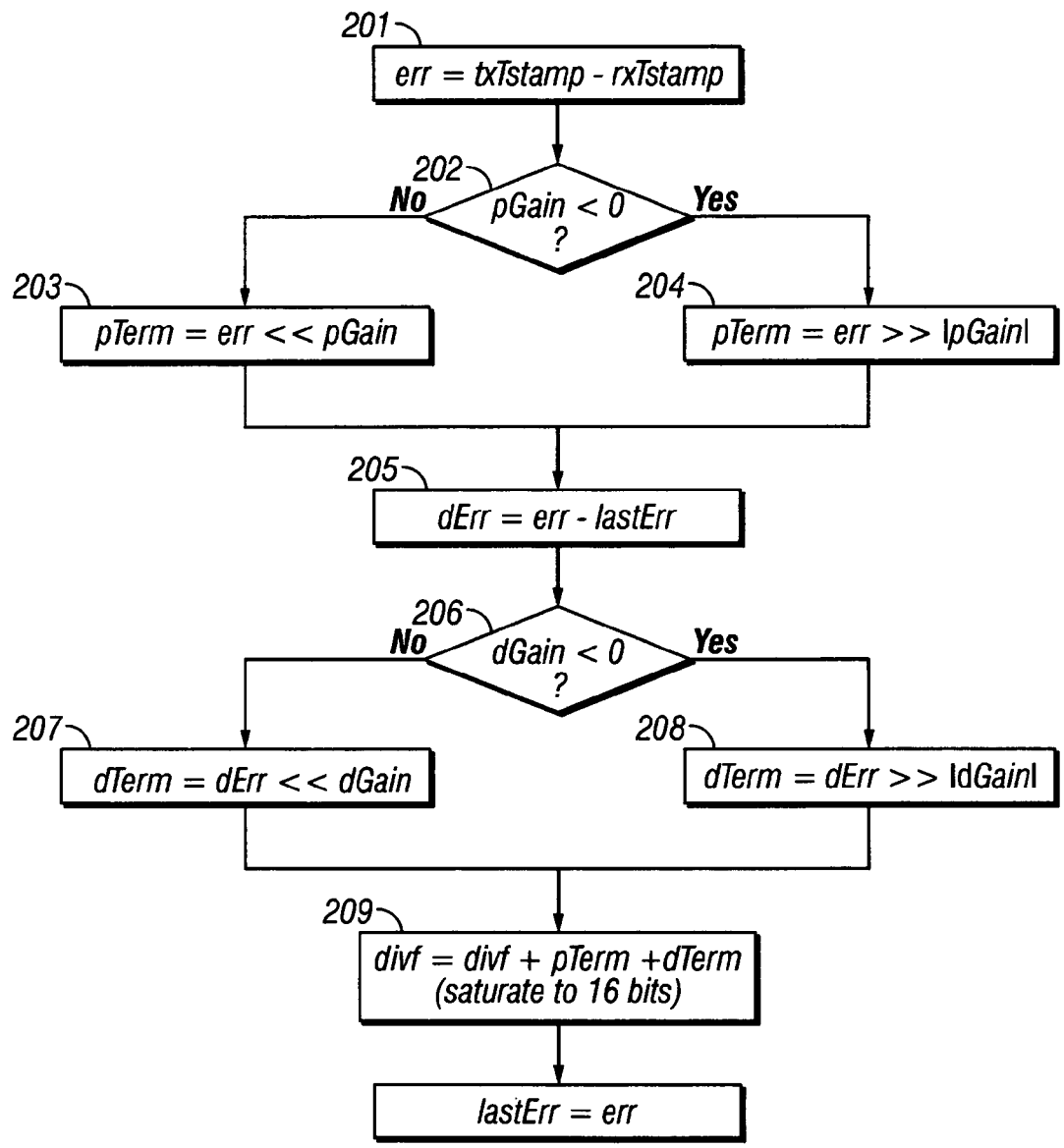
FIG. 2 is a flowchart illustrating the process of wireless clock synchronization in accordance with an embodiment of the present invention.

FIG. 2 is a flowchart illustrating the process of wireless clock synchronization in accordance with an embodiment of the present invention. When the video output device receives the first packet, it initializes rxTstamp by equating it to txTstamp. It also sets the variable lastErr to 0. To achieve and maintain clock synchronization, control is applied after every N packets by adjusting divf according the process shown in FIG. 2 so that rxTstamp becomes equal to txTstamp. It should be noted that N is selected such that the interval between N packets is approximately 1 ms.

The procedure illustrated in FIG. 2 is applied at a control point which occurs every N packets. The first step comprises defining the proportional error "err" as the difference between txTstamp and rxTstamp (step 201).

Next, the system determines if pGain is less than 0 (step 202). If pGain≧0, it represents the number of bits to leftshift, and is equivalent to multiplication by $2^{pGain}$. If pGain<0, it represents the number of bits to rightshift and is equivalent to integer division by $2^{|pGain|}$.

The invention calculates a proportional term, pTerm, which is used to increment the control input divf by an amount proportional to err. The invention scales err by pGain to obtain pTerm (steps 203, 204) and adds pTerm to divf (see below).

Because the system has a long delay, a divf adjustment usually results in only a small reduction in err, when err is re-computed at the next control point. Therefore, the pTerm at the next control point will be almost the same, and the adjustment to divf at this next control point will be almost equal to the adjustment at the preceding control point.

Therefore, using pTerm alone to adjust divf will result in similar adjustments to divf at successive control points and these successive similar adjustments will have a cumulative over-compensating effect on the video output clock frequency. This over-compensating effect will change the sign of err. Control via pTerm will then repeat the over-compensation in the opposite direction. Because the over-compensation forces err to increase or decrease beyond zero, instead of settling to zero, control via pTerm results in perpetual video-output clock frequency oscillation, rather than synchronization.

To prevent perpetual oscillation, the invention computes the differential error, dErr, which measures the reduction in err from the preceding control point to the current control point (step 205).

Next, the system determines if dGain is less than 0 (step 206). If dGain≧0, it represents the number of bits to leftshift, and is equivalent to multiplication by $2^{dGain}$. If dGain<0, it represents the number of bits to rightshift and is equivalent to integer division by $2^{|dGain|}$.

dErr is then scaled by dGain to get dTerm (steps 207, 208) which is added to divf. dTerm magnifies the err reduction due to the preceding control point and thus prevents an overly large divf adjustment which would have resulted because pTerm ignores prior history. By mitigating the effect of pTerm, the dTerm prevents over-compensation and the resulting perpetual oscillation.

Both pTerm and dTerm are then added to divf (step 209). By adjusting the divf according to the proportional and differential errors, the present invention allows precise adjustment of the video output clock frequency to achieve a defined average over a specified time period. In one embodiment of the present invention, the divf is a 16-bit fractional divider input for a phase locked loop (PLL) that drives the video output pixel clock. divf is saturated to the range [0,65535] and, for VGA, allows the frequency to be adjusted between 24.75 to 25.5 MHz in 11.44 Hz steps.

Once steady state is reached, where the transmit timestamp equals the receive timestamp over a number of wireless video packets, the video output pixel clock is synchronized to the video input pixel clock. Pixel clock synchronization operates continually to maintain synchronization between the two clocks. (During initial pixel clock synchronization the video output device is not driving its video interface and the video data packets are discarded.) Continuous clock synchronization is used because of clock drift. Because the video output clock frequency is adjusted in discrete steps (11.44 Hz for VGA), this frequency will almost never match the video input clock frequency exactly. Therefore, continuous clock synchronization is used to vary the video output clock frequency so that it averages out to the input clock frequency.

Figure 3:
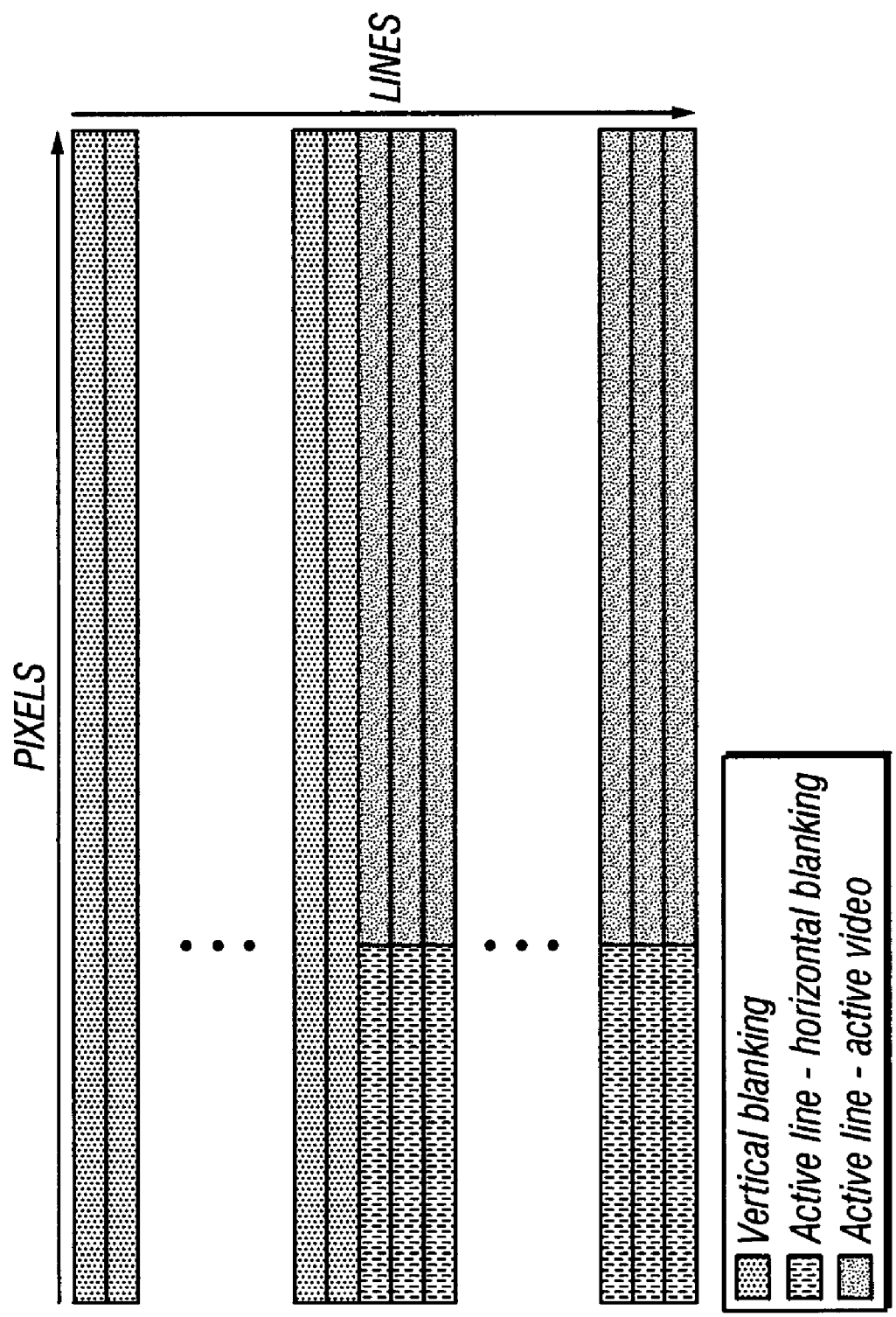
FIG. 3 shows the format of a video frame in accordance with an embodiment of the present invention.

FIG. 3 shows the format of a video frame in accordance with an embodiment of the present invention. Each video frame is composed of active and blanking lines. Each active line is composed of active and blanking pixels. Only the data during the active video section of the video frame is displayed.

Video frame synchronization aligns the video output data stream to the video input data stream, such that the input video data stream is N lines ahead of the output video data stream. This offset is less than the total number of lines in each video frame, so that only a fraction of a video frame must be buffered at any time, thus minimizing the required video buffer size. As long as the pixel clocks are kept synchronized, the established video frame offset will be maintained indefinitely.

Figure 4:
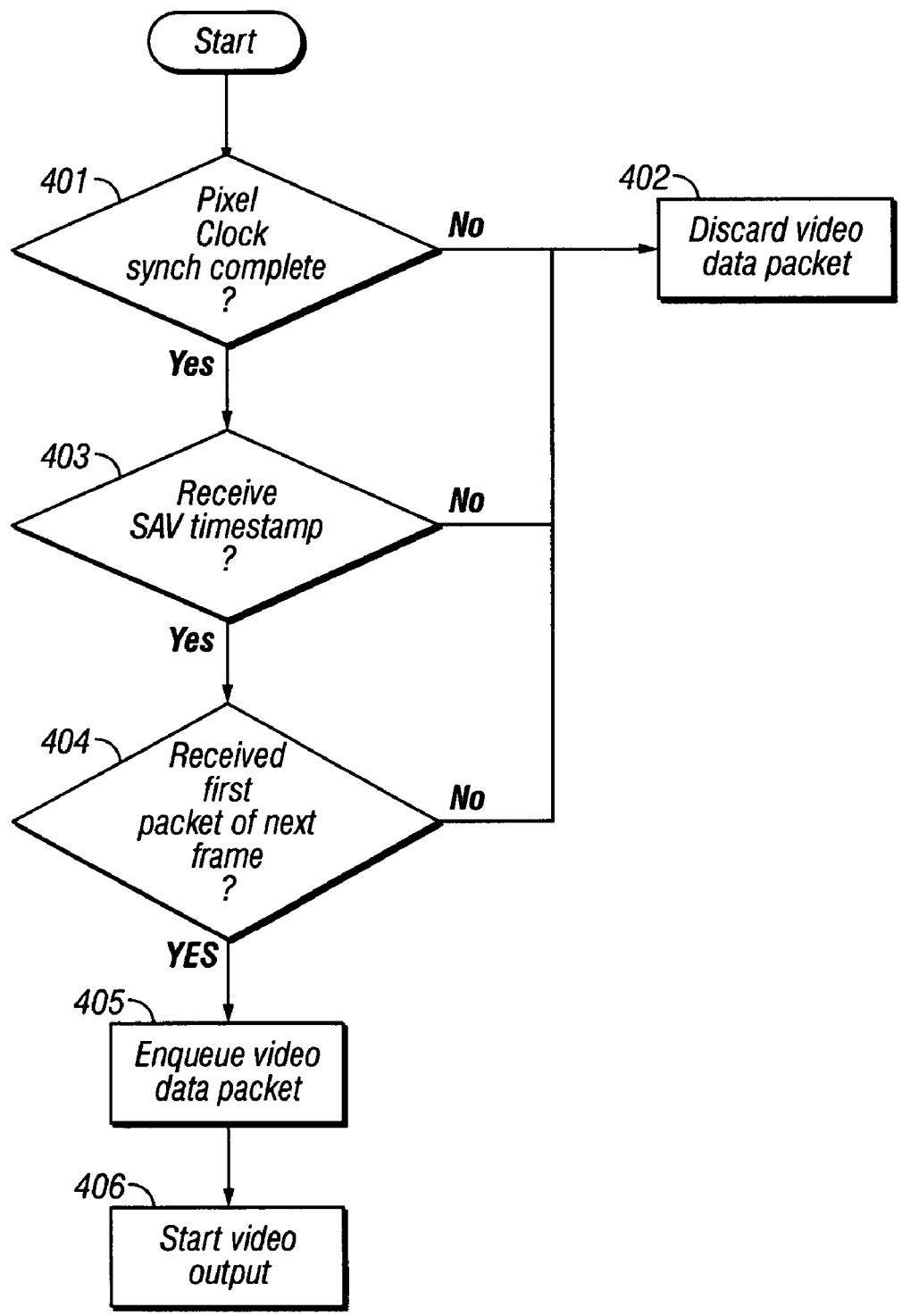
FIG. 4 shows the process of video frame synchronization in accordance with an embodiment of the present invention.

FIG. 4 shows the process of video frame synchronization in accordance with an embodiment of the present invention. The video output device first waits for the synchronization of the pixel clocks to complete (step 401). Clock synchronization is detected as complete when err is small over a few successive control points, e.g., |err|<3 over 5 control points.

After the pixel clocks have been synchronized, the video output device waits for receipt of a Start of Active Video (SAV) timestamp (step 402). The video input device video counter is latched at the start of active video for each video frame, creating the SAV timestamp. The SAV timestamp is transmitted to the video output device before the end of the current video frame and is used by the output device to determine when to start video output (as indicated by its video counter):

Video Out Start=(SAV timestamp)+((Number of active lines/frame)*(Number of total pixels/line)+((Number of lines offset required)*(Number of total pixels/line))

After the SAV timestamp has been received, the video output device waits until it receives the first wireless data packet of the next video frame, which marks the beginning of the next frame (step 403). Each data packet includes the video line number (between 1 and the number of active lines per frame) for the first line in the packet. The start of the next video frame is determined by monitoring these line numbers. When the line number in the current data packet is less than the line number from the previous data packet, this indicates the start of a new video frame. Until the start of the new video frame is detected, the video output device discards incoming data packets.

When the first data packet of the next video frame is detected, the output device stops discarding incoming data packets and starts enqueuing them (step 404).

The output device then waits for the video counter to equal the Video Out Start value (step 405), which allows it to begin video output (step 406).

As a result, the present invention is able to minimize the amount of buffering to a fraction of a video frame. For example, in a conventional 1600×1200 pixel display the amount of buffering required by the prior art may be as much as 11 MB. Using the present invention, with a wireless throughput of, e.g., 400 Mbps, the amount of buffering can be reduced to 100 KB, two orders of magnitude in saved memory.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

We claim:

1. A method for synchronizing wireless video data, comprising:
   (a) synchronizing a first clock in a wireless video output device with a second clock in a wireless video input device, further comprising:
      receiving a plurality of transmit timestamps from the video input device;
      creating a plurality of receive timestamps upon detection of a plurality of video packets from the video input device;
      determining a first difference between one of the transmit timestamps and one of the receive timestamps at a first control point;
      determining a second difference between another one of the transmit timestamps and another one of the receive timestamps at a second control point;
      adjusting a clock frequency of the video output device by an amount based on the first difference; and
      adjusting the clock frequency by an additional amount based on a difference between the first difference and the second difference; and
   (b) after synchronizing the first clock with the second clock, synchronizing video frames from said wireless video output device with video frames from said wireless video input device, wherein only a fraction of a video frame is buffered at any time.

2. The method according to claim 1, wherein the first clock and second clock are pixel clocks.

3. The method according to claim 1, wherein step (a) further comprises:
   creating a transmit timestamp and inserting it into a video data packet upon initiation of transmission by the video input device; and
   adjusting the clock frequency of the video output device such that its average value over a specified number of data packets equals the clock frequency of the video input device.

4. The method according to claim 1, wherein step (b) further comprises offsetting the data stream from the video input device N lines ahead of the data stream from the video output device, wherein N is less than the total number of lines in a single video frame.

5. The method according to claim 4, wherein said offset in data streams is established by transmitting a start of active video (SAV) timestamp to the video output device before the end of the current video frame, wherein the video output device uses the SAV timestamp to determine when to start video output.

6. An apparatus for synchronizing wireless video data, comprising:
   (a) a first video counter in a wireless video input device; and
   (b) a second video counter in a wireless video output device;
   wherein the first video counter and second video counter are used to synchronize a first clock in the video output device with a second clock in the video input device, wherein the process of synchronizing the clocks comprises:
      latching the value of the first video counter upon initiation of wireless transmission and inserting a plurality of transmit timestamps into a plurality of video data packets;
      receiving the plurality of transmit timestamps in the plurality of video data packets from the video input device;
      latching the value of the second video counter and creating a plurality of receive timestamps upon reception of said plurality of video data packets;
      determining a first difference between one of the transmit timestamps and one of the receive timestamps at a first control point;
      determining a second difference between another one of the transmit timestamps and another one of the receive timestamps at a second control point;
      adjusting a clock frequency of the video output device by an amount based on the first difference; and
      adjusting the clock frequency by an additional amount based on a difference between the first difference and the second difference; and
   wherein, after said clocks are synchronized, the first video counter and second video counter are used to synchronize video frames from said video output device with video frames from said video input device, wherein only a fraction of a video frame is buffered at any time.

7. The apparatus according to claim 6, wherein the first clock and second clock are pixel clocks.

8. The apparatus according to claim 6, wherein the process of synchronizing the clocks further comprises:
   adjusting the clock frequency of the video output device such that its average value over a specified number of data packets equals the clock frequency of the video input device.

9. The apparatus according to claim 6, wherein video frames are synchronized such that the data stream from the video input device is offset N lines ahead of the data stream from the video output device, wherein N is less than the total number of lines in a single video frame.

10. The apparatus according to claim 9, wherein said offset in data streams is established by transmitting a start of active video (SAV) timestamp to the video output device before the end of the current video frame, wherein the video output device uses the SAV timestamp to determine when to start video output.

11. An apparatus for synchronizing wireless video data, comprising:

means for synchronizing a first clock in the apparatus with a second clock in a wireless video input device, the means for synchronizing comprising:
  means for receiving a plurality of transmit timestamps from the video input device;
  means for creating a plurality of receive timestamps upon detection of a plurality of video packets from the video input device;
  means for determining a first difference between one of the transmit timestamps and one of the receive timestamps at a first control point;
  means for determining a second difference between another one of the transmit timestamps and another one of the receive timestamps at a second control point;
  means for adjusting a clock frequency of the apparatus by an amount based on the first difference; and
  adjusting the clock frequency by an additional amount based on a difference between the first difference and the second difference; and
means for synchronizing video frames from the apparatus with video frames from said wireless video input device after synchronizing the first clock with the second clock, wherein only a fraction of a video frame is buffered at any time.

12. A computer program product comprising:
a non-transitory computer-readable medium having stored thereon, computer executable instructions that, if executed by an apparatus, cause the apparatus to perform a method comprising:
  synchronizing a first clock in a wireless video output device with a second clock in a wireless video input device by:
    receiving a plurality of transmit timestamps from the video input device;
    creating a plurality of receive timestamps upon detection of a plurality of video packets from the video input device;
    determining a first difference between one of the transmit timestamps and one of the receive timestamps at a first control point;
    determining a second difference between another one of the transmit timestamps and another one of the receive timestamps at a second control point;
    adjusting a clock frequency of the video output device by an amount based on the first difference; and
    adjusting the clock frequency by an additional amount based on a difference between the first difference and the second difference; and
  synchronizing video frames from said wireless video output device with video frames from said wireless video input device after synchronizing the first clock with the second clock, wherein only a fraction of a video frame is buffered at any time.

13. A display apparatus, comprising:
a display;
a first video counter;
a first clock; and
a processor, wherein the processor is configured to:
  synchronize the first clock with a second clock in a video input device using the first video counter and information about a second video counter in the video input device by:
    receiving a plurality of transmit timestamps from the video input device;
    latching the value of the first video counter and creating a plurality of receive timestamps upon detection of a plurality of video packets from the video input device;
    determining a first difference between one of the transmit timestamps and one of the receive timestamps at a first control point;
    determining a second difference between another one of the transmit timestamps and another one of the receive timestamps at a second control point;
    adjusting a clock frequency of the video output device by an amount based on the first difference; and
    adjusting the clock frequency by an additional amount based on a difference between the first difference and the second difference;
  synchronize video frames for the display apparatus with video frames from said video input device using the synchronized first clock, wherein only a fraction of a video frame is buffered at any time; and
  display the video frames for the display apparatus on the display.

14. An apparatus for synchronizing wireless video data, comprising:
a first video counter; and
a receiver configured to receive information about a second video counter in a wireless video input device;
wherein the first video counter and information about the second video counter are used to synchronize a first clock in the apparatus with a second clock in the video input device, wherein the process of synchronizing the clocks comprises:
  receiving a plurality of transmit timestamps from the video input device;
  latching the value of the first video counter and creating a plurality of receive timestamps upon detection of a plurality of video packets from the video input device;
  determining a first difference between one of the transmit timestamps and one of the receive timestamps at a first control point;
  determining a second difference between another one of the transmit timestamps and another one of the receive timestamps at a second control point;
  adjusting a clock frequency of the video output device by an amount based on the first difference; and
  adjusting the clock frequency by an additional amount based on a difference between the first difference and the second difference;
wherein, after said clocks are synchronized, the first video counter and second video counter are used to synchronize video frames from the apparatus with video frames from said video input device, wherein only a fraction of a video frame is buffered at any time.

15. The apparatus according to claim 14, wherein the first clock and second clock are pixel clocks.

16. The apparatus according to claim 14, wherein video frames are synchronized such that the data stream from the video input device is offset N lines ahead of the data stream from the video output device, wherein N is less than the total number of lines in a single video frame.

17. The apparatus according to claim 16, wherein said offset in data streams is established by transmitting a start of active video (SAV) timestamp to the apparatus before the end of the current video frame, wherein the apparatus uses the SAV timestamp to determine when to start video output.

* * * * *